United States Patent [19]

Crowe

[11] Patent Number: 5,075,978

[45] Date of Patent: Dec. 31, 1991

[54] ILLUMINATED SPIRIT LEVEL

[76] Inventor: Harold W. Crowe, 123 Joan Dr., Walhalla, S.C. 29691

[21] Appl. No.: 682,843

[22] Filed: Apr. 4, 1991

Related U.S. Application Data

[63] Continuation of Ser. No. 547,510, Jul. 2, 1990, abandoned.

[51] Int. Cl.⁵ ............................................. G01C 9/32
[52] U.S. Cl. ..................................... 33/348.2; 33/379; 33/381
[58] Field of Search .................... 33/348.2, 350, 379, 33/380, 381, 348; 174/24; 362/120, 236, 119, 186

[56] References Cited

U.S. PATENT DOCUMENTS

| 2,615,122 | 10/1952 | Coombs | 33/348 |
| 3,192,375 | 6/1965 | Olson | 33/348.2 |
| 4,271,458 | 6/1981 | George, Jr. | 362/236 |
| 4,655,470 | 5/1987 | George, Jr. | 362/236 |
| 4,833,788 | 5/1989 | Munro | 33/348.2 |
| 4,876,798 | 10/1989 | Zimmerman | 33/348.2 |

FOREIGN PATENT DOCUMENTS 1182146  5/1987  United Kingdom ................. 33/379

Primary Examiner—William A. Cuchlinski, Jr.
Assistant Examiner—Alvin Wirthlin
Attorney, Agent, or Firm—Bailey & Hardaway

[57] ABSTRACT

An illuminated spirit level comprising an elongated bar having a number of apertures wherein bubble tubes are positioned for measurement of the flatness of a surface. An illumination means including lamps, a system of conductor wires, a dual battery configuration connected in series and a switch are contained within the bar. Each aperture is illuminated by a lamp and each lamp communicates with the batteries by conductor wires which are immersed in a channel containing a vibration-dampening fluid. The fluid is supplied through a duct which is accessible from the exterior of the bar. A switch protruding through the exterior of the bar permits power to the lamps.

3 Claims, 2 Drawing Sheets

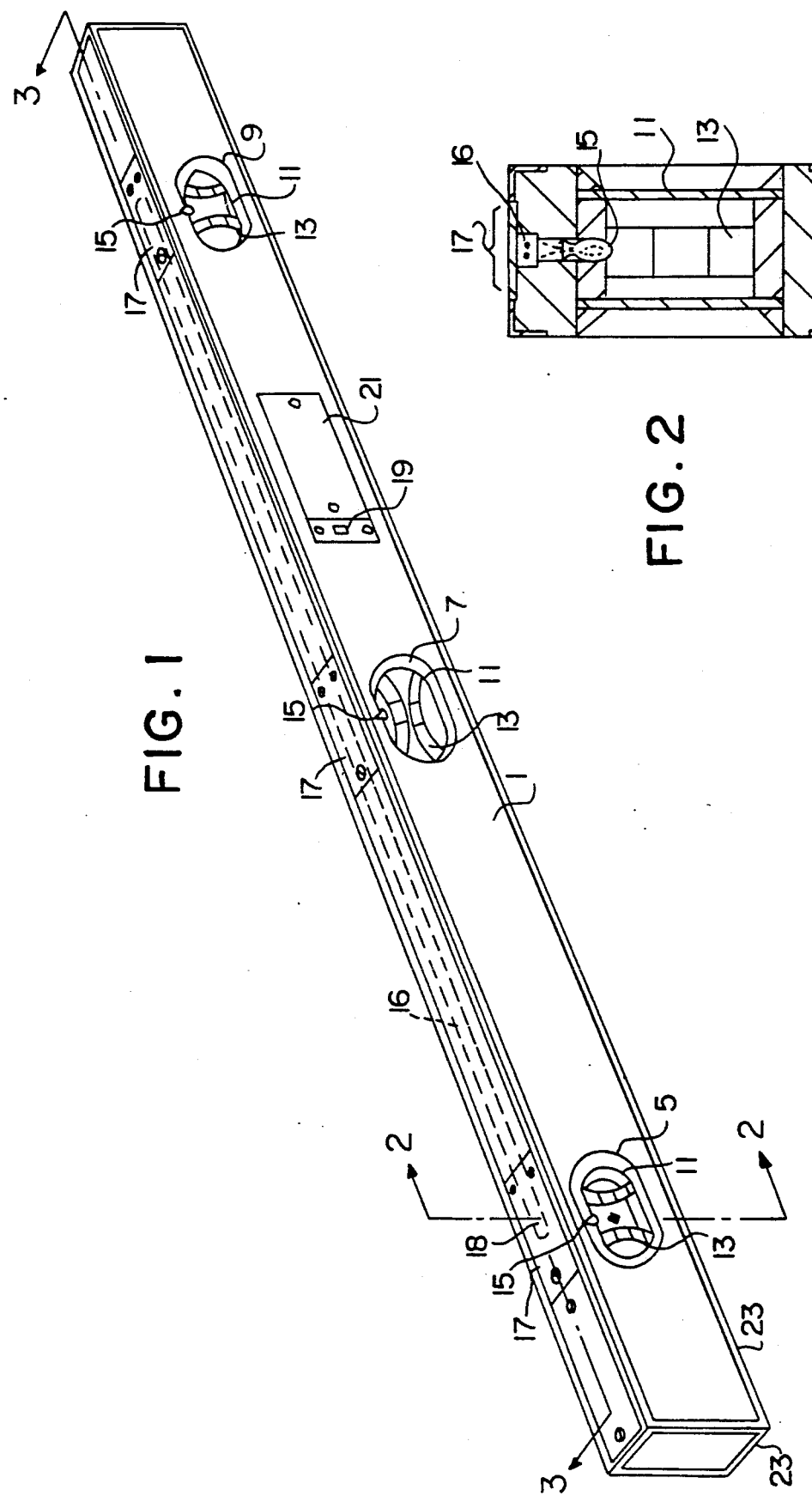

ILLUMINATED SPIRIT LEVEL

This application is a continuation of application Ser. No. 07/547,510, filed Jul. 2, 1990 now abandoned.

BACKGROUND OF THE INVENTION

This invention relates generally to the art of levelling, and more particularly, to a spirit level having illumination means for measuring the level of a surface in dim light or darkness.

The art of providing level measuring devices having illumination means has been pursued for many years. Indeed, various levels have been developed wherein lamps are used to illuminate the area around the bubble tubes. A system of conductor wires has been used to convey current from a battery source to the lamps. In the past, this method of conductivity has been unsuccessful because the components have been unable to endure vibration from handling and from general use. Without a means for dampening vibration, the life of such an electrical system is shortened.

Hansen in U.S. Pat. No. 3,584,212 teaches a spirit level containing a number of bubble tubes illuminated by small lamps connected to a battery source by a system of wires. A similar device is disclosed in U.S. Pat. No. 2,806,133 to Aube wherein a level includes a number of lamps, conductor wires, and a battery source comprising a means to illuminate the bubble tubes. Similarly, U.S. Pat. No. 4,484,393 to LaFreniere describes a level having a bubble tube which is illuminated by two light paths directed through it.

Attempts to discourage the damage caused by vibration have been pursued typically by placing a lamp, or lamps, in direct contact with a battery source. This eliminates the need for conductor wires. However, such a method limits the number of lamps that can be used. Hubbard in U.S. Pat. No. 3,003,054 teaches a spirit level illuminated by a single lamp directly connected to a battery source to eliminate the need for conductor wires which may be damaged by vibration. Another such device is disclosed in U.S. Pat. No. 4,745,687 to Wilhelmy wherein an illuminated level for a recreational vehicle comprises a liquid-filled container which is illuminated by a single lamp connected to a battery. U.S. Pat. No. 4,833,788 to Munro discloses an attachable apparatus of two lamps and a battery source which can be externally connected to a level.

The prior art has failed, however, to provide an illuminated spirit level which is adequately durable to resist breakage in use.

SUMMARY OF THE INVENTION

It is therefore an object of this invention to provide a novel illuminated spirit level which is more reliable than spirit levels heretofore provided.

It is a further object of this invention to provide an illuminated spirit level having a dual battery source connected in series.

It is yet a further object of this invention to provide an illuminated spirit level having a number of spatially disposed lamps which communicate with the battery source by a network of conductor wires which are immersed in a vibration dampening fluid.

These as well as other objects are accomplished by an illuminated spirit level comprising an elongated bar having a number of apertures wherein bubble tubes are positioned for measurement of the level of a surface. An illumination means including lamps, a power source, a system of conductor wires, and a switch are positioned within the bar. Each aperture is illuminated by a lamp which communicates with the power source via a conductor wire immersed in a vibration dampening fluid. The fluid is supplied through an opening on the exterior of the bar. A switch which protrudes through the exterior of the bar allows power to the lamps.

BRIEF DESCRIPTION OF THE DRAWINGS

FIG. 1 of the drawings illustrates an illuminated spirit level in accordance with this invention.

FIG. 2 of the drawings illustrates a cross-sectional view of a first aperture along the lines 2—2 of FIG. 1 in accordance with this invention.

DETAILED DESCRIPTION

Figure 3:
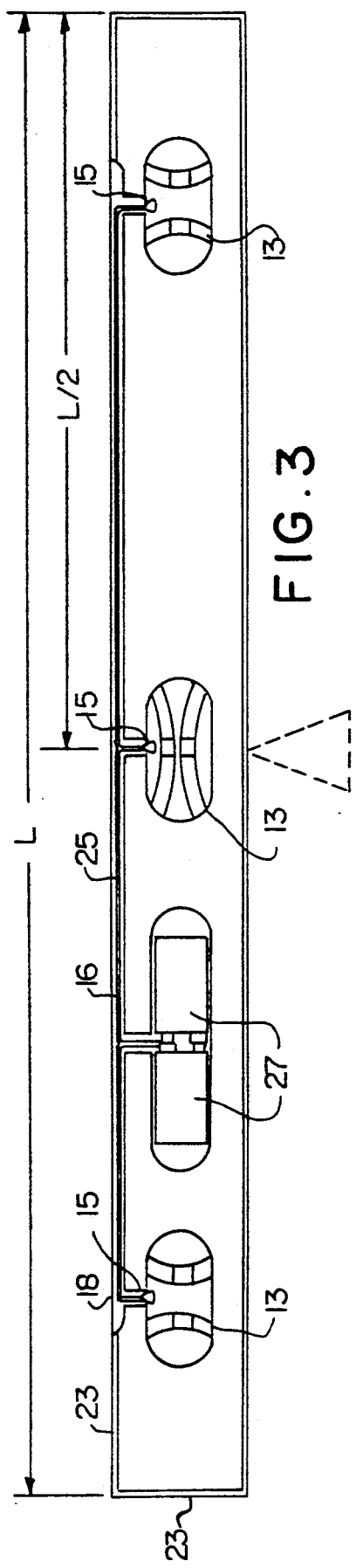
FIG. 3 of the drawings illustrates a side elevation taken along line 3—3 of FIG. 1. This shows the battery configuration and the system of conductor wires in accordance with this invention.

In accordance with this invention, it has been found that a spirit level may be adapted for use in dark or dimly lit work areas by providing a practical means to illuminate the bubble tubes. The illuminated spirit level in this invention possesses the advantage of having vibration protection means for a system of conductor wires. This allows the conductor wires to last longer than those indicated by prior art which have no vibration protection. Various other advantages will become apparent from a reading of the following description given with reference to the various figures of drawing.

FIG. 1 shows a lighted carpenters' level in accordance with this invention. The level illustrated here comprises an elongated bar 1 which may be fashioned of wood, aluminum, or other durable material. The bar 1 has straightedges 23 made of warp-resistant material. A first aperture 5, a middle aperture 7, and a third aperture 9 are evenly spaced along bar Each aperture is enclosed on both sides by a transparent material 11 such as plastic, glass, or similar material to provide a secure, waterproof enclosure. A number of bubble tubes 13 containing a viscid fluid and a levelling bubble therein are positioned in pairs inside each of apertures 5, 7, and 9. As is well known in the art, the location of the bubble will indicate the level of a surface upon which the elongated bar 1 is placed.

Lamps 15 protrude into each of the apertures 5, 7, and 9. The lamps illuminate each bubble tube and allow the lighted carpenters' level to be used in dim light or darkness. Should replacement of lamps be necessary, access to them is easily achieved through removable portals 17 in the elongated bar 1. An on/off switch 19 is secured to the elongated bar and selectively interrupts or maintains current to light lamps 15. The current is provided by two batteries connected in series, which are housed within battery compartment 21.

Handling and general usage by a carpenter inevitably cause vibrations inside the level. Such vibrations will often damage the sensitive electrical wiring. To reduce the possibility of vibration damage, this invention provides a means of protecting the wiring from vibration. Specifically, all conductor wires 25 as seen in FIG. 3, as well as all bases of the lamps 15, are immersed in a vibration dampening fluid such as silicone, or the like, which insulates the wires 25 from damaging vibrations.

The fluid is contained in a longitudinally extending channel 16 which runs lengthwise along top portion of elongated bar 1. The fluid is supplied and replenished at duct 18 by pouring fluid therethrough.

FIG. 2 illustrates a cross-sectional view of the first aperture 5 in accordance with this invention. It should be noted that the middle aperture 7 and third aperture 9 are identical to this illustration with the exception of the bubble tubes 13 being horizontally disposed in the middle aperture 7. This figure illustrates the transparent material 11 which encloses the aperture, a bubble tube 13, a lamp 15, a removable portal 17, and the longitudinal channel 16 which serves as the reservoir for the dampening fluid.

FIG. 3 illustrates a cross-sectional view taken along line 3—3 of FIG. 1 which illustrates the bubble tubes 13, conductor wires 25, batteries 27 connected in series, lamps 15, longitudinal channel 16, the duct 18 through which the vibration dampening fluid is poured, and the straightedges 23.

Figure 4:
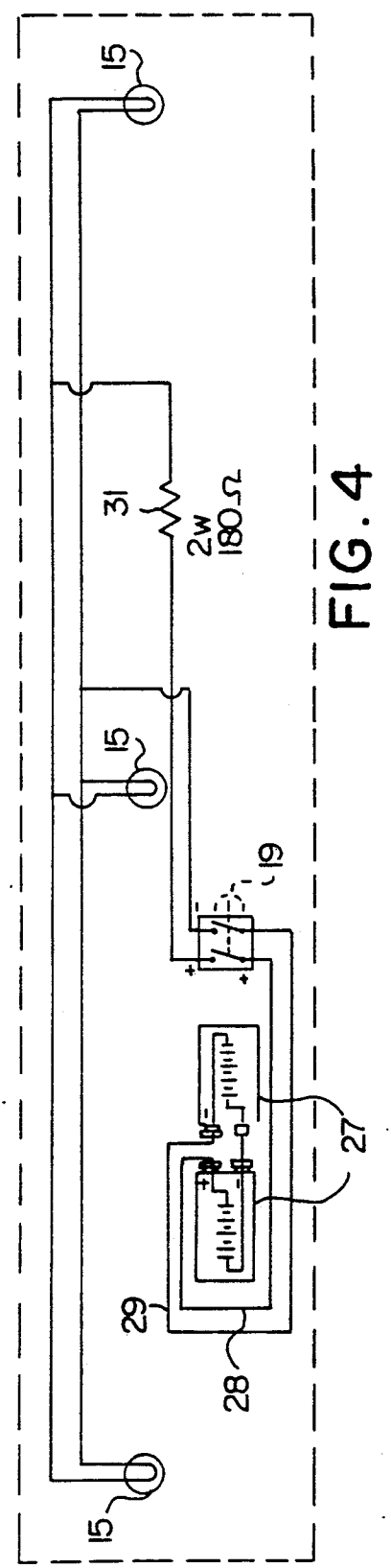
FIG. 4 of the drawings is a wiring diagram of this invention.

In FIG. 4, a schematic of the circuit is illustrated to which this invention should not be regarded as restricted. Current from the batteries 27 travels along the positive wire 28 through the switch 19 when the contacts are closed and then through a current limiting resistor 31 which limits the current flow. Next, the current flows in equal amounts to three bulbs and then returns along the negative wire 29 through the switch 19 back to the batteries 27.

It is thus seen in accordance with this invention a novel level has been developed wherein an elongated bar possesses a number of spatially disposed level measuring devices which are illuminated by several lamps. Two batteries connected in series supply power to the lamps through a system of wires running along a series of channels which contain a vibration dampening fluid. A durable and long-lasting level with inner circuitry which is resistant to damaging vibration is demonstrated. As various modifications become apparent to those in the art from a reading of the above description, such modifications are within the spirit and scope of this invention as defined by the following appended claims.

That which is claimed is:

1. An illuminated spirit level comprising an elongated bar with a plurality of bubble tubes for measurement of the level of a surface in dim light or darkness, comprising:

a first, a middle, and a third enclosed aperture aligned on said bar, each aperture having two bubble tubes positioned therein;

at least one illuminating lamp per aperture, said lamps each having a base fixed inside said bar and a bulb extending into the corresponding aperture to provide light therein;

a power supply comprising a dual battery configuration;

conductor wires providing electrical communication between the batteries and the lamps;

a current limiting resistor electrically connected between the batteries and the lamps;

a contact switch maintaining current flow from the batteries to the bulbs along the conductor wires when said switch is in a closed position and further interrupting current flow from the batteries to the bulbs along the conductor wires when said switch is in an open position;

an enclosed longitudinal channel running lengthwise along a top portion of said bar from said first aperture to said third aperture and housing said conductor wires and said bases of said lamps; and, a vibration-dampening fluid contained within said longitudinal channel in which said conductor wires are immersed;

said bases of said lamps being only partially immersed in said vibration-dampening fluid.

2. An illuminated spirit level according to claim 1 wherein each said aperture is enclosed on both sides by a transparent, waterproof, impact resistant material.

3. An illuminated spirit level according to claim 1 wherein said vibration-dampening fluid consists of silicone or other insulating fluid and is introduced into said channel via a duct accessible from the exterior of said bar.

* * * * *